(12) United States Patent
Merchan et al.

(10) Patent No.: US 12,556,549 B2
(45) Date of Patent: Feb. 17, 2026

(54) SYSTEM AND METHOD FOR ADAPATIVE METHOD FOR AUTOMOTIVE INSTRUSION DETECTION AND PREVENTION SYSTEM FOR VEHICLES DRIVING IN CONVOY FORM OR PLANTOONING

(71) Applicant: Robert Bosch GmbH, Stuttgart (DE)

(72) Inventors: Jorge Guarjardo Merchan, Pittsburgh, PA (US); Ekaterina Kolycheva, St. Petersburg (RU); Stefan Gehrer, Pittsburgh, PA (US); Tobias Gehrmann, Stuttgart (DE)

(73) Assignee: Robert Bosch GmbH (DE)

( * ) Notice: Subject to any disclaimer, the term of this patent is extended or adjusted under 35 U.S.C. 154(b) by 282 days.

(21) Appl. No.: 18/320,631

(22) Filed: May 19, 2023

(65) Prior Publication Data

US 2024/0388591 A1    Nov. 21, 2024

(51) Int. Cl.
*H04L 9/40* (2022.01)
*G08G 1/00* (2006.01)

(52) U.S. Cl.
CPC .......... *H04L 63/1416* (2013.01); *G08G 1/22* (2013.01); *H04L 63/1425* (2013.01); *H04L 63/20* (2013.01)

(58) Field of Classification Search
CPC . H04L 63/1416; H04L 63/1425; H04L 63/20; G08G 1/22
See application file for complete search history.

(56) References Cited

U.S. PATENT DOCUMENTS

| | | |
|---|---|---|
| 8,903,593 B1 | 12/2014 | Addepalli et al. |
| 2014/0215491 A1* | 7/2014 | Addepalli ........... H04L 43/0876 719/313 |
| 2014/0380442 A1* | 12/2014 | Addepalli ............. B60W 50/10 726/6 |
| 2015/0264554 A1* | 9/2015 | Addepalli ............. H04W 76/45 370/328 |
| 2017/0251339 A1* | 8/2017 | Addepalli ........... H04L 43/0811 |

(Continued)

FOREIGN PATENT DOCUMENTS

EP    3197730 B1    2/2020

OTHER PUBLICATIONS

Tsugawa, Sadayuki, Results and Issues of an Automated Truck Platoon within the Energy ITS Project, 2014 IEEE Intelligent Vehicles Symposium (IV) Jun. 8-11, 2014, Dearborn, Michigan, US.

(Continued)

*Primary Examiner* — Baotran N To
(74) *Attorney, Agent, or Firm* — Dickinson Wright PLLC

(57) ABSTRACT

A method executed by an on-board unit of a vehicle includes receiving real-time data from vehicles in a convoy, wherein the data includes an indicator regarding a vehicle type within the convoy, providing a policy with a set of rules and comparing the data with the policy, providing a set of reference data corresponding to the convoy, wherein the set of reference data includes a trend of previous data indicating normal operation of the convoy, comparing the set of data with the set of reference data, wherein a determination of whether the set of data deviates from the trend of previous data is based on operation of one of the vehicles in the convoy, and initiating an operation when there is both a violation of the policy and a deviation within the set of data from the set of reference data is detected.

20 Claims, 5 Drawing Sheets

(56) References Cited

U.S. PATENT DOCUMENTS

| | | | |
|---|---|---|---|
| 2019/0020985 A1* | 1/2019 | Dai | H04W 8/26 |
| 2019/0318632 A1 | 10/2019 | Sambale et al. | |
| 2022/0350888 A1 | 11/2022 | Gutierrez et al. | |
| 2022/0385680 A1 | 12/2022 | Felke et al. | |
| 2023/0010974 A1 | 1/2023 | Cho | |

OTHER PUBLICATIONS

Akawuah, Francis and Kong, Fanxin, Real-Time Adaptive Sensor Attack Detection in Autonomous Cyber-Physical Systems, 2021 IEEE 27th Real-Time and Embedded Technology and Application Symposium (RTAS), pp. 237-250.

He, Tianjia; Zhang, Lin; Kong, Fanxin; and Salekin, Asif; Exploring Inherent Sensor Redundancy for Automotive Anomaly Detection, Department of Electrical Engineering and Computer Science, Syracuse University, DAC2020, pp. 1-6.

Zhang, Linlin; Chen, Feng, Ma, Xiaodong, and Pan, Xiaodong, Fuel Economy in Truck Platooning: A Literature Overview and Directions for Future Research, Hindawi, Journal of Advanced Transportation, vol. 2020, Article ID 2604012, pp. 1-11.

Wang, Zichang; Guo, Fei; Meng, Yan; Li, Huaxin; Zhu, Haojin; and Cao, Zhenfu, Detecting Vehicle Anomaly by Sensor Consistency: An Edge Computing Based Mechanism, School of Computer Science and Software Engineering, East China Normal University, Shanghai, China, 2018, pp. 1-7.

Tyree, Zachariah; Bridges, Robert A.; Combs, Frank L.; and Moore, Michael R., Exploiting the Shape of CAN Data for In-Vehicle Intrusion Detection, Oak Ridge National Laboratory, Oak Ridge, TN, Florida Atlantic University, Boca Raton, FL, 2018, pp. 1-5.

* cited by examiner

SYSTEM AND METHOD FOR ADAPATIVE METHOD FOR AUTOMOTIVE INSTRUSION DETECTION AND PREVENTION SYSTEM FOR VEHICLES DRIVING IN CONVOY FORM OR PLANTOONING

TECHNICAL FIELD

The present disclosure relates to intrusion detection systems (IDS), such as those in vehicles.

BACKGROUND

Controller Area Network (CAN) bus is the central communication network in several modern systems such as automotive systems, aerospace systems and industrial systems. Some of the nodes on the CAN bus and more generally on the internal network of the vehicle are equipped with remote interfaces. Such interfaces are often used to enable over-the-air updates and together with that to offer additional services, measure usage of applications, measure usage of certain functions in the ECU to enable maintenance services, etc.

Another trend in the automotive industry is the requirement of vehicles having systems that detect attacks, so called Intrusion Detection System (IDS). The automotive system of modern vehicles is equipped with a large number of electronic control units (ECUs) connected by a network using CAN, automotive Ethernet or other network technology. These ECUs control the vehicle by running more and more complex software and network connectivity has been increasing further because of sensor data like camera streams or LIDAR. The resulting automotive system is becoming an increasingly attractive target for adversaries interested in compromising this system. Manipulation of network traffic or process changes on an ECU pose various threats to vehicles' passengers, traffic participants and to the vehicle itself.

IDS adoption is driven by an increase in attack surface in the vehicle and thus, likelihood of attack with potentially disastrous safety implications. Because of this, new regulations have been enacted (e.g. WP.29, UN R 155), which will require vehicles to have IDSs that can detect and potentially react to an attack.

An IDS aims at detecting this compromise and collects all kinds of automotive data to verify consistency and ensure integrity of network traffic and command and control. Recent IDS solutions send this data to a cloud backend for further processing.

SUMMARY

A first embodiment, a method executed by an on-board unit of a vehicle includes receiving real-time data from vehicles in a convoy, wherein the data includes an indicator regarding a vehicle type within the convoy, providing a policy with a set of rules and comparing the data with the policy, providing a set of reference data corresponding to the convoy, wherein the set of reference data includes a trend of previous data indicating normal operation of the convoy, comparing the set of data with the set of reference data, wherein a determination of whether the set of data deviates from the trend of previous data is based on operation of one of the vehicles in the convoy, and initiating an operation when there is both a violation of the policy and a deviation within the set of data from the set of reference data is detected.

A second embodiment discloses a method executed by an on-board unit of a vehicle that includes receiving a set of data in real time from a plurality of vehicles in a convoy, wherein the first set of data includes indicator regarding a vehicle type within the convoy. The method further includes providing a set of reference data corresponding to the plurality of vehicles in the convoy, wherein the set of reference data includes a trend of previous data indicating normal operation of the vehicles in the convoy. The steps also include comparing the set of data with the set of reference data, wherein a determination of whether the set of data deviates from the trend of previous data is based on operation of one of the plurality of vehicles in the convoy. Further, the method includes initiating an operation when there is a deviation within the set of data from the set of reference data is detected.

A third embodiment discloses a system for monitoring a plurality of vehicles in a convoy that includes a wireless transceiver in one or more of the plurality of vehicles and configured to communicate data from the plurality of vehicles, one or more processors, wherein the one or more processors is in communication with the wireless transceiver. The one or more processors are collectively programmed to receive a set of data in real time from a plurality of vehicles in a convoy, wherein the first set of data includes an indicator regarding a vehicle type within the convoy, provide a set of reference data corresponding to the plurality of vehicles in the convoy, wherein the set of reference data includes a trend of previous data indicating normal operation of the vehicles in the convoy, compare the set of data with the set of reference data, wherein a determination of whether the set of data deviates from the trend of previous data is based on operation of one of the plurality of vehicles in the convoy, and initiate an operation to output a notification when there is a deviation within the set of data from the set of reference data is detected.

DETAILED DESCRIPTION

Figure 1:
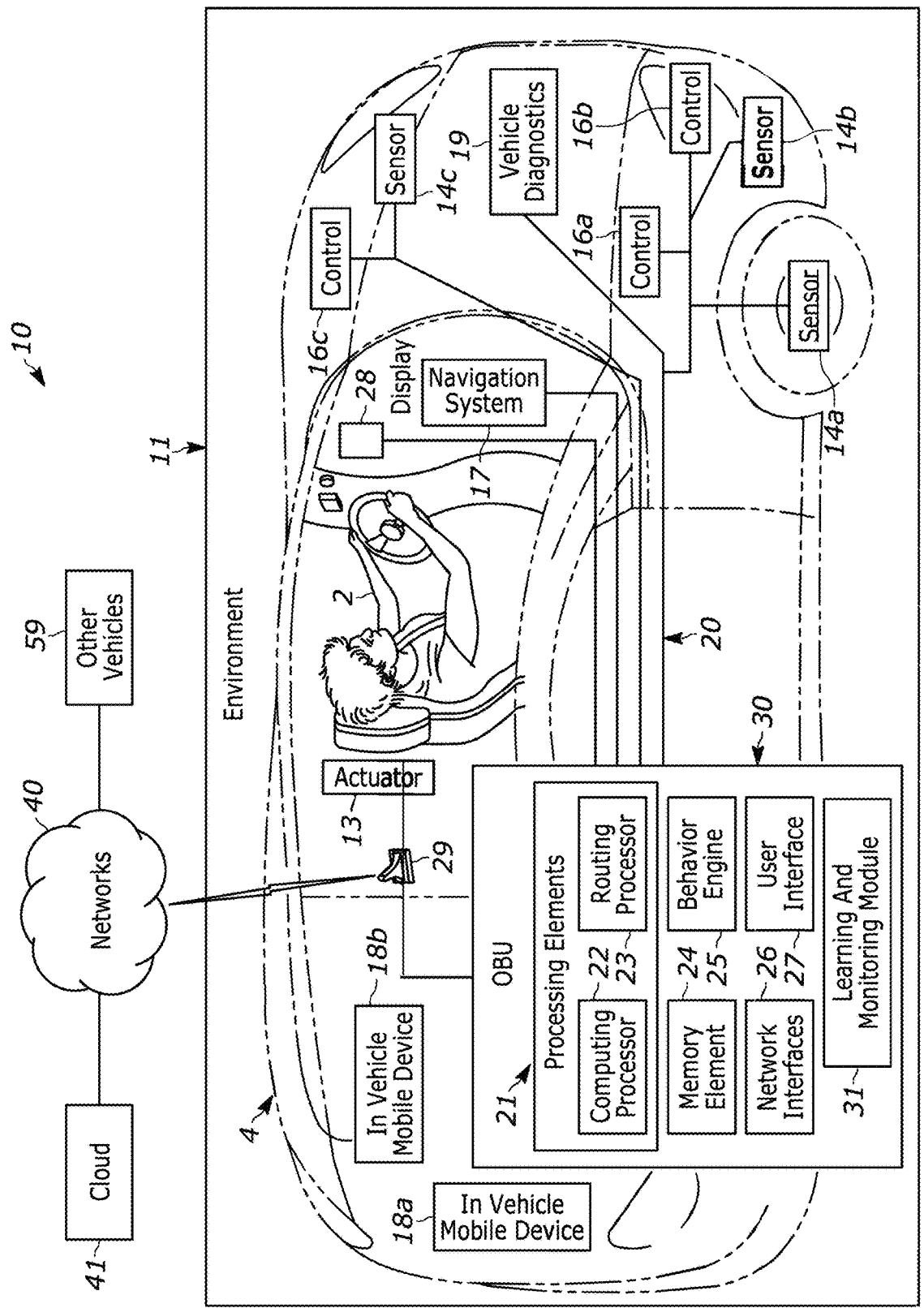
FIG. 1 is a simplified block diagram of a communication system for analyzing vehicular behavior in a network environment in accordance with one embodiment of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

IDS's may be utilized in a vehicle convoy. Additionally to the data collected from individual vehicle, an IDS can also benefit from the information gathered from the fleet of external cars which perform a similar behavior, e.g. automotive trucks transporting goods from point A to point B. Abnormal correlations between related signal in different vehicles can uncover an intrusion or attack.

The abnormality potential may be first detected locally in a vehicle by a so called integrated on-board unit (OBU) and then compared to other vehicles for purposes of detecting defects that can be fixed or mitigated by a vehicle manufacturer. Another feature may include a method that may attempt to determine if the abnormality is happening in more than a pre-defined threshold times and if so, it may report it or output an alert or notification. Other embodiments may include that the system may have an on-board unit (OBU) that monitors vehicle signals, physiological signals of the driver and signals from monitoring changes or events surrounding the vehicle. An OBU may be include a system which can include numerous nodes in communication system such as any device, network element, client, service, application or other object, which can send/receive/forward information over a communication channel in a network. The system may determine whether collected data deviates from a trend that depends at least partially on a profile from the current driver of the vehicle.

A policy-based trend analyzer may utilize reference data to change a policy or notify interested and authorized entities (e.g., manufacturers, government entities, etc.) of ongoing policy violations. For example, the policy-based trend analyzer may identify that a majority of drivers speed on certain roads. In response, the speed limit may be changed or more speed enforcement may be used on that road, for example. The possibility of continuous training may be used to improve performance of the model and reduce false positive or false negative rates. Predictive diagnostics may be used that are based on historical and real-time data. A cloud component may be utilized in one embodiment that can perform diagnostics in the cloud and the ability to collect data from different deployments with different technologies and compare them.

Malfunction detection of abnormal behavior may first be detected locally in-vehicle and then by identifying whether the abnormal behavior trend is observed on a specific vehicle over a time and space series and has a correlation with that of other vehicles. If there is no correlation, then it is likely that some of the components in the vehicle are malfunctioning. Correlation analysis may also be done also via cluster analysis. In contrast to other systems, the proposed methods disclosed may be able to monitor interactions of desired machine devices (e.g., ECUs or sensors in a vehicle), to gradually learn their behavior logic and to build a state machine for each machine device that could potentially emulate its behavior. Furthermore, the illustrative embodiments may monitor the correlation of these machine devices with respect to each other. An illustrative example may include when both gas pedal and brake pedal signals are active at the same time, the brake pedal signals should have higher priority and override the gas pedal signals and should be monitored as a safety requirement for correct operation.

Truck platooning may include a sequence of two or more trucks linking in a convoy traveling with a small inter-vehicle distance, using connectivity technology and automated driving support systems. The truck at the head of the platoon acts as the leader, with the vehicles behind reacting and adapting to changes in its movements. A driver controls the lead truck while following vehicles will—in the future—may be completely autonomous. Initially, drivers will remain in control at all times, so they can also decide to leave the platoon and drive independently.

The benefits of such convoys may be savings in fuel consumption and $CO_2$ emission, more efficient road usage, faster goods delivering and reducing traffic jams. In platooning, only a lead driver in a platoon is actively driving. That leaves drivers in the semis behind the leader free to use the time for other tasks, such as administrative work or making calls. In perspective of using autonomous vehicles, this will reduce the number of required drivers. Truck platooning also helps to improve safety. Braking is automatic and immediate; the trucks following the lead vehicle only need one-fifth of the time a human would need to react.

As trucks in a convoy are moving on the same route, vehicle's signals will be changing in a similar way according to occurring physical phenomena. Thus, a system can collect a set of signals from one truck, calculate correlation coefficients between these signals and use this information as a reference in case if the system may assume that some signals in another truck were tampered.

It is expected that passenger vehicles will also travel in such configurations once autonomous vehicles become practical at levels 4 and 5. Thus, the ideas described here apply to both trucks and passenger vehicles. We have also demonstrated that vehicles that are not in a convoy configuration but following a similar travel plan (i.e., start and wait for 2 minutes, drive for 50 mins, stop for 10 mins, continue driving for 20 mins) even if not following the same exact route can benefit from techniques described in this disclosure as well. Thus, for example, vehicles that are in a dense traffic area would also benefit from the techniques described in the next sections.

The system described herein may use correlation between signals within the same vehicle, as well as correlation between signals among different vehicles in a platoon formation in order to detect anomalies. In one embodiment, the vehicles of the platoon may not utilize any physiological signals at all (for example, physiological signals from the driver are never collected). This may be advantageous as health information regarding the vehicle need not be collected and thus any privacy concerns may be mitigated. The system may also consider data from external to vehicle devices (mobile phones, laptops, various gadgets etc.). In one example, a large difference in signal values can also indicates the malfunction of one of the trucks in the convoy and can be used as an additional service call signal (for example, in case of spare parts wear) historical values of correlation parameters can be used as an additional source of information for road conditions monitoring.

FIG. 1 illustrates a simplified block diagram of a communication system 10 for analyzing vehicular behavior in a vehicular network environment. The example architecture of FIG. 1 includes an end user (driver) 2 operating a vehicle 4 in environment 11 that includes an on-board unit (OBU) 30 or processor/controller. In this particular example, OBU 30 includes one or more processing elements 21, which include a computing processor 22 and a routing processor 23. OBU 30 may also include a memory element 24, a behavior engine module 25, network interfaces 26, a user interface 27, and a display 28, where such devices may be associated with particular end users (passengers or driver) within vehicle 4. Generally, OBU 30 can be suitably coupled to numerous different nodes in communication system 10, where a node can be any device (e.g., a machine device or a mobile device), network element, client, server, peer, service, application, or other object capable of sending, receiving, or forwarding information over a communications channel in a network. For example, a node may be another vehicle with a wireless transceiver or a mobile phone, in one example.

OBU 30 may be coupled to machine devices in communication system 10, such as a plurality of sensors 14 $a$-$c$, a plurality of vehicle controls (e.g., one or more electronic control units (ECUs)) 16 $a$-$c$, and a plurality of actuators, such as actuator 13. In one example embodiment, sensors 14 $a$-$b$ and controls 16 $a$-$b$ may be part of an automotive diagnostic system, indicated by vehicle diagnostics 19, which may also be suitably integrated with OBU 30. OBU 30 may further include capabilities associated with navigation system 17 (e.g., a global positioning system (GPS)). OBU 30 may also be suitably coupled to various in-vehicle mobile devices 18 $a$-$b$ at any given time, where such devices may be associated with particular end users (passengers or driver) within vehicle 4.

FIG. 1 also includes one or more networks 40, representing various types of connections to vehicle 4 (e.g., via antenna 29). Each established network of networks 40 may have a logical coupling to one or more remote nodes, including remote nodes of other vehicles 59 and various remote servers or "clouds" 41. A 'remote node' may be any node located externally to a particular vehicle, such as vehicle 4. Examples of possible remote nodes that could be located externally to the vehicle include end user devices, mobile devices, network elements, electronic devices in networked systems (e.g., server in a datacenter, end user device in a local area network (LAN), etc.), OBUs of other vehicles, road-side infrastructure devices, and road-side user devices.

Elements of FIG. 1 may be coupled to one another through one or more interfaces (e.g., network interfaces 26) employing any suitable connection (wired or wireless), which provides a viable pathway for electronic communications. Additionally, any one or more of these elements may be combined or removed from the architecture based on particular configuration needs. Communication system 10 may include a configuration capable of transmission control protocol/Internet protocol (TCP/IP) communications for the electronic transmission or reception of packets in a network. Communication system 10 may also operate in conjunction with a user datagram protocol/IP (UDP/IP) or any other suitable protocol, where appropriate and based on particular needs. In addition, communication system 10 may also include a configuration capable of accommodating legacy bus subsystems 20 that may be employed to convey information across the myriad of machine devices (e.g., sensors 14 $a$-$c$, controls 16 $a$-$c$, actuator 13) in vehicle 4.

Embodiments of communication system 10 can enable analysis of vehicular behavior in a network environment, including on-board and remote behavioral analysis, remote diagnostics, abnormal behavior detection, and machine device behavior learning, or any other method. An on-board unit (OBU) in a vehicle may be configured to facilitate collection of information associated with subsystems and the various associated machine devices (e.g., sensors, actuators, ECUs, etc.) of the vehicle to enable an analysis of vehicular behaviors in real time in a real world environment. The behavior engine may be provided in certain embodiments to monitor network flows in the vehicular environment to detect abnormal trends of the vehicle. A predictive diagnostic technique can substantially reduce or eliminate human bias and/or error in determining whether the safety of a vehicle has been compromised. Additionally, collected information can be used to create behavior state machines for machine devices of the subsystems. These behavior state machines may be used as a reference for behavior.

Many useful, but disparate, networks may exist in today's vehicles (e.g., automobiles, airplanes, trains, boats, etc.). External networks may be accessed from a vehicle by certain electronic devices when a communication link is available. An 'external network' may encompass a network that is external to a vehicle, where the network is a collection of nodes interconnected by communicative channels that facilitate electronic communications therebetween. For example, a mobile phone inside a vehicle may be used to access a 3G base station for connection to other mobile devices or the Internet.

In addition to wireless network communications external to a vehicle, multiple internal network subsystems (e.g., bus subsystems, IP networks) may exist in the vehicle to provide communication pathways to various machine devices distributed throughout the vehicle. A 'subsystem' as used herein is intended to encompass a network within a vehicle, where the network is a collection of nodes interconnected by communicative channels that facilitate electronic communications therebetween, in which the nodes are integrated with or otherwise linked to the vehicle. The nodes in internal network subsystems can include machine devices such as, for example, sensors, actuators, electronic control units (ECUs), detectors, entertainment systems including speakers, a CD and/or DVD player, a radio, etc. In addition, an internal network subsystem may exist for IP machine devices such as certain vehicle navigation systems (e.g., GPS) and any other machine devices configured for IP communications.

Other internal vehicular networks may also exist within a vehicle, and possibly be associated with simple content delivery. For example, mobile devices may be used within a vehicle to communicate with other electronic devices within the vehicle or with external networks of the vehicle (e.g., a mobile phone with 3G Internet connection). Hence, various levels of network usage, different purposes of network usage, and different agents (e.g., humans, machine devices, external devices, mobile devices) associated with the network usage may occur in a single vehicle. Network usage in each of the identified cases may have a different usage scope, different latency, different associated routing, different policy requirements, and the like.

Subsystems of vehicles typically include legacy bus subsystems (or subnets), each providing communication pathways to particular machine devices distributed throughout a vehicle. In a typical automobile, for example, more than 80 ECUs exchange data over and across these bus subsystems. Many of these subnets are segregated and thus, communication between the subnets is not feasible. Nevertheless, the number of ECUs and traffic exchanged between them is expected to continue to grow.

Vehicles may employ a number of different bus subsystems to convey information across the plurality of sensors and actuators that are disseminated over a vehicle. Examples of typical vehicular bus subsystems include a Controller Area Network (CAN), which uses a message based protocol, designed for and typically used by automotive applications. The CAN bus is a vehicle bus standard designed to allow microcontrollers, sensors, and other devices to communicate with each other via the CAN (e.g., without a host computer). CAN may be used for soft real time control of devices such as the antilock braking system. Local Internet Network (LIN) may be used to sense external conditions such as light, or to control small mechanisms such as door locking systems. Yet another bus subsystem could include Flexray, a dedicated network for hard real time controllers, used for drive-by-wire and/or brake-by-wire applications in which information from the engine and/or the wheels is collected and transmitted to appropriate applications and/or data repositories. Media Oriented System Transport (MOST) can also be found in vehicles for transmitting audio, video, and voice on fiber optics. Some of these buses include vehicle-specific interconnects. Additionally, Ethernet may be used to interconnect machine devices in the vehicle.

In accordance with embodiments disclosed herein, communication system 10 may resolve issues relating to analyzing vehicular behavior, including vehicular behavioral analysis, remote diagnostics, predictive diagnostics, and machine device behavior. Specifically, communication system 10 can utilize one or more fully integrated on-board unit (OBU) 30 to manage vehicular behavioral anomalies and machine device behavioral states. Even more specifically, an integrated on-board unit (OBU) 30 is configured for managing behavioral anomalies from vehicle 4 by receiving data, comparing the data to a reference set of data (which may be done in a number of manners, as explained further below), and identifying any differences between the data and the reference set of data. Data can be identified according to any currently existing or later developed means. Furthermore, an OBU can utilize a learning and monitoring process to define machine device behavior specifications for each vehicle.

In further embodiments disclosed herein, a cloud-based platform may be accessed by a vehicle using available wireless network access options provided by OBU 30 (e.g., multiple wireless interfaces 26) and appropriate routing protocols. The cloud-based platform can provide dynamic, real time vehicle diagnostics from data provided by selected machine devices of the vehicle. Accordingly, vehicles with on-board units can provide data to a cloud for remotely managing behavioral anomalies of the vehicles and correlating the anomalies across multiple vehicles having defined similarities (e.g., model, type, parts, etc.). Additionally, a cloud-based platform can provide remote diagnoses of machine devices to assist in determining actual causes of particular malfunctions. Finally, cloud-based embodiments disclosed herein provide online monitoring and learning of vehicle component behavior based on interactions, combining learned behavior from many vehicles to derive a more complete behavior via a remote online service, updating vehicles with current behavior specifications, and monitoring behavior for failure detection and analysis.

Note that in this specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and may include any such features that are included in one or more embodiments of the present disclosure, but may or may not necessarily be combined in the same embodiments.

Furthermore, it should be appreciated by one skilled in the art that the words "optimize," "optimization," "optimum," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

Turning to the details of FIG. 1, end user 2 can be associated with a human agent (e.g., a driver or passenger) of vehicle 4. End user 2 may initiate communication in communication system 10 via some network of networks 40, and such communication may be initiated through any suitable device, inclusive of in-vehicle mobile device 18 a or 18 b, display 28, and navigation system 17, which could be integrated with OBU 30 and/or an infotainment system. In one embodiment, additional displays may be provided for one or more passengers in vehicle 4. Mobile devices, such as in-vehicle mobile devices 18 a-b, are inclusive of mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges within communication system 10. Data, as used herein in this specification, refers to any type of numeric, voice, video, or script data, or any type of source or object code, or any other suitable information in any appropriate format that may be communicated from one point to another in electronic devices and/or networks.

In-vehicle mobile devices 18 a-b, and mobile devices external to vehicle 4, may communicate with OBU 30 of communication system 10 through any wireless or suitable wired communication link and may be configured as a personal area network (PAN) or a wireless personal area network (WPAN) or any other appropriate networking architecture or system that facilitates communications in a network environment. Wired and wireless communication links may be inclusive of any electronic link such as wireless technologies (e.g., Bluetooth, Zigbee, IEEE 802.11x, WiFi Direct, 60 GHz, ultrawideband (UWB), etc.), a USB cable, an HDMI cable, etc. Connection between mobile devices and OBU 30 may be configured based on particular needs and logistics. In one example, an external mobile device may be connected to OBU 30 through a USB cable or wireless network when, for example, the external mobile device is a diagnostic tool used by a mechanic for servicing vehicle 4.

Networks 40 represent external networks, which can be a series of points or nodes of interconnected communication paths for receiving, sending and/or forwarding packets of information that propagate through communication system 10. Networks 40 offer communicative interfaces between any of the components of FIG. 1 and remote nodes and other electronic devices of clouds 41 and other vehicles 59, for example. Networks 40 could be any local area network (LAN), wireless local area network (WLAN), wide area network (WAN), wireless wide area network (WWAN), metropolitan area network (MAN), wireless metropolitan area network (WMAN), wireless single hop or multi-hop vehicle-to-vehicle network, vehicle-to-vehicle-to-infrastructure network, virtual private network (VPN), Intranet, Extranet, or any other appropriate architecture or system that facilitates communications in a network environment. Networks 40 may include any suitable communication link to OBU 30 such as wireless technologies (e.g., IEEE 802.11x, 802.16, WiFi, WiMax, near field communications (NFC), DSRC, etc.), satellite, cellular technologies (e.g., 3G, 4G, LTE, GSM/WCDMA/HSPA, CDMA1x/EVDO, etc.), etc., or any combination thereof. Networks 40 may also include configurations capable of transmission control protocol/Internet protocol (TCP/IP) communications, user datagram protocol/IP (UDP/IP), or any other suitable protocol, where appropriate and based on particular needs.

Embodiments of OBU 30 may include one or more distinct interfaces, represented by network interfaces 26, to facilitate communication via the various networks (including both internal and external networks) described herein. Such network interfaces 26 may be inclusive of multiple wireless interfaces (e.g., WiFi, WiMax, 3G, 4G, white space, 802.11x, satellite, Bluetooth, LTE, GSM/WCDMA/HSPA, CDMA1x/EVDO, DSRC, GPS, etc.). Other interfaces represented by network interfaces 26, may include physical ports (e.g., Ethernet, USB, HDMI, etc.), interfaces for wired and wireless internal subsystems, and the like. Similarly, each of the nodes and user equipment (e.g., mobile devices) of communication system 10 can also include suitable interfaces for receiving, transmitting, and/or otherwise communicating data or information in a network environment.

In addition to multiple wireless interfaces (e.g., network interfaces 26), OBU 30 also includes wireless interface selection algorithms and appropriate routing protocols to enhance the wireless connectivity options to external networks from vehicle 4 (e.g., directly to roadside infrastructure devices, via single or multi-hop connectivity through other vehicles or nodes). Additionally, this configuration enables a substantial amount of connectivity between OBU 30 and external networks. Thus, OBU 30 is configured to provide consistent and reliable external network access from vehicle 4 through a mobile network infrastructure (e.g., 3G, 4G, LTE, etc.) and/or through other wireless technology infrastructures (e.g., WiFi, WiMax, other radio protocols, etc.).

Regarding a physical implementation of OBU 30 and its associated components, any suitable permutation may be applied based on particular needs and requirements, including the design of the particular vehicle in which OBU 30 is implemented. In example implementations, various other components of OBU 30 may be installed in different physical areas of the vehicle or may be installed as single unit, with display 28 being positioned to allow driver access. Other displays may be provided in suitable locations for access by passengers in particular passenger seats. In one implementation, multimedia, networking, and communication components may be positioned at some distance from the vehicle engine (e.g., in or near the rear or trunk area if the engine is in the front area of the vehicle).

Communication system 10 may be configured to facilitate communication with machine devices (e.g., sensors, instruments, electronic control units (ECUs), embedded devices, actuators, displays, etc.). OBU 30 may be implemented to provide one or more suitable communication interfaces (e.g., network interfaces 26) to legacy bus subsystems in vehicles such as, for example, a controller area network (CAN) a low speed network (LIN), a Flexray communications protocol network, media oriented systems transport (MOST), and the like.

Typically, numerous ECUs, with different embedded software, may be found in a single automobile and may communicate via one or more internal network subsystems 20. Such subsystems 20 generally include legacy bus subsystems such as Controller Area Network (CAN), LIN, Flexray, and MOST. For example, vehicle controls 16 *a-b* may be inclusive of any embedded system or ECU that controls one or more of the electrical subsystems in vehicle 4. Sensors 14 *a-b* may represent wheel and headlight sensors respectively. Actuator 13 may represent a vehicle setting device such as a seat positioning device for adjusting various seat positions (e.g., longitudinal position relative to the brake and gas pedals, tilt position, lumbar support, etc.). Actuator 13 and other similar vehicle setting devices (e.g., temperature controls, sunroof, door locks, power windows, etc.) may be configured for communication via LIN internal network subsystem. Sensor 14 *c* represents a type of sensor or device that may be configured for communications via Flexray communications protocol (e.g., a radar collision sensor). Vehicle control 16 *c*, representing one or more ECUs, may be suitably integrated for controlling the Flexray network and sensors and other associated components.

Subsystems 20 may have alternative configurations in other embodiments, and may be suitably coupled to or integrated with OBU 30. For example, subsystems 20 may include a central hub that interconnects sensors, actuators, and controls and manages communications to and from OBU 30. In yet other embodiments, subsystems 20 could be partially or fully configured using Ethernet networking technology, or other suitable technologies enabling Internet Protocol (IP) communications, user datagram protocol (UDP) communications, or other suitable communications protocol for relaying packets across a network. OBU 30 may be configured to provide one or more suitable communication interfaces (e.g., network interfaces 26) to accommodate the possible implementations of subsystems 20, including interfaces for bus subsystems (e.g., CAN, LIN, Flexray, MOST), an IP network, a UDP network, or any other suitable protocol or communication architecture provided to enable network communication with machine devices in vehicle 4.

In the particular example shown in FIG. 1, vehicle 4 includes capabilities associated with navigation system 17 and vehicle diagnostics 19. Navigation system 17 may be provided in various embodiments including, for example, a portable navigation system or, alternatively, a fixed navigation system, each of which may be configured for wireless or wired communications to OBU 30. In other embodiments, navigation system 17 may be integrated with OBU 30, and navigation information such as maps and points of interest could be displayed for users on display 28. Other more specific machine devices, not shown in FIG. 1, may include display panel instruments, climate controls, interior lights, door locks, trunk open/shut actuator, hood open/shut actuator, seat heater and/or cooler, sunroof open/shut actuator, window heater/defroster/defogger, info/entertainment systems (e.g., speakers, radio, DVD, CD, etc.), and the like.

Behavior engine module 25 in OBU 30 may be configured to enable identifying anomalies in a vehicular network environment and, particularly, for analyzing vehicular hardware behavior and detecting unsafe behaviors. In one embodiment, behavior engine module 25 is a hardware based behavior analysis engine using content inspection and machine learning algorithms. Behavioral analysis engine 25 can find repetitions of certain attributes and generate a behavior curve within a configurable time window. An abnormal trend of the behavior curve can be detected in which unexpected repetition attributes occur.

Behavior engine module 25 may receive a set of data in real time from each machine device of a plurality of machine devices associated with at least one vehicle in a consumer environment. Data may be any data output from a machine device. In one example scenario, sensor 14 *a* may transmit data indicating the brake has been applied on vehicle 4. The data may be a trend of responses from a machine device over time. For example, the data may represent that actual braking of vehicle 4 occurs each time at half a second after user 2 applies the brake.

The data may be collected in real time. Real time may be defined as the earliest amount of time that is reasonable to collect the data. For example, once the brake is applied, sensor 14 *a* may take a short time to identify the brake was applied, convert braking signal information to data, and then send the data to an appropriate remote node of a cloud 41. So even though the data is not collected at the exact moment the brakes are applied, the data is still collected in real time that includes the delay for identification of the event for the sensor and data transmission.

Additionally, a consumer environment may be one example of environment 11. A consumer environment is one in which vehicle 4 is used by a consumer or user in a manner that is intended for vehicle 4 to be used. For example, the consumer environment for a traditional car may be roads and highways. Alternatively, the consumer environment for a tank may be rough terrain or a battlefield. A consumer environment is in contrast to a testing environment in which conditions may be controlled and vehicle 4 is not being used in a normal manner.

Furthermore, data may be collected from at least one machine device in at least one vehicle. OBU 30 of vehicle 4 may collect the data from a machine device of vehicle 4 and/or from machine devices of other vehicles 59.

Additionally, behavior engine module 25 may also be configured to provide a set of reference data corresponding to a machine device of the plurality of machine devices. The set of reference data may be a trend of previous data received from the machine device. For example, the set of reference data may be that each time a brake is applied by user 2 in vehicle 4, braking occurs after half a second. Also, the set of reference data may be a common trend based on a previous sets of data of the machine device in other vehicles. For example, data collected from other vehicles 59 may indicate that each time a brake is applied in each of other vehicles 59, braking occurs after half a second in each of other vehicles 59. Also, the set of reference data may be a common trend based on data from other machine devices of other vehicles similar to the machine device. For example, data collected from similar vehicles in other vehicles 59 may indicate that each time a brake is applied in each of the similar vehicles, braking occurs after half a second in each of the similar vehicles.

Additionally, behavior engine module 25 may also be configured to compare the set of data with the set of reference data. The data collected in real time may be compared in real time or at a later point in time to a reference set of data. Comparing the data may be done by behavior engine module 25 and/or by another processor in networks 40.

Behavior engine module 25 may also be configured to detect a deviation within the set of data from the set of reference data. The deviation may be user defined and/or set by behavior engine module 25. In different illustrative embodiments, the deviation may be identified by the use of an algorithm or analyzer program. For example, a deviation may occur when data coming from a machine device in real time indicates three seconds elapsed between user 2 applying the brake and actual braking operation. In contrast, if the reference set of data indicates a trend of only half a second lapses between applying the brake and an actual braking operation, no deviation may be detected.

Additionally, behavior engine module 25 may be configured to initiate an operation in response to detecting the deviation. A response may be an alert and/or an action. For example, if a delay in braking is detected, an alert may be sent to user 2 that there is a malfunction in the braking of vehicle 4. In addition to the alert, behavior engine module 25 may communicate with other systems in vehicle 4 to compensate for the delayed braking.

By initiating an alert and/or action, behavior engine module 25 may prevent catastrophic vehicular events and possibly save lives. User 2 may be able to react more quickly to danger or issues with vehicle 4. Additionally, vehicle 4 may be able to take action on behalf of user 2 and prevent an accident from occurring. By detecting changes in vehicle control system information, visual/radar/lidar based change detection in surrounding events/objects and consequently employing alert systems, automatic feedback vehicle control system and other driver assist tools into vehicles; behavior engine module 25 may prevent accidents from occurring.

Vehicle manufacturers may receive data from different behavior engine modules from all vehicles. Manufacturers may use this data to identify recalls or for improving a new model, for example, by aggregating the data and evaluating the collective data.

In addition to comparing machine device data to a reference set of data, behavior engine module 25 may also be configured to provide a policy with a set of rules. The policy could be, for example, a standard or preference indicated by a manufacturer or government entity. The set of rules may be specific elements as applied to the machine device. For example, in different illustrative embodiments, a safety policy may have a rule that an actual braking operation may not occur later than one second after a brake is applied by user 2 of vehicle 4.

Additionally, behavior engine module 25 may also be configured to compare the data with the policy and detect a violation within the set of data of at least one rule of the set of rules. For example, in the braking scenario, if the policy indicates no more than a one second delay and the data indicates a real time detection of a two second delay, a violation is detected. In response to detecting the violation of the policy, behavior engine module 25 may initiate an operation such as an alert and/or a remedial action.

In addition to identifying deviations from trends and violations of policy, behavior engine module 25 may also adjust the reference set of data based on the set of data to form a new reference set of data when the deviation detected is within a range. For example, if data is received that a braking occurred three quarters of a second after the brake was applied, the reference set of data may be adjusted to include a delay of three quarters of a second as being part of the normal trend. A user, manufacturer, government policy, and/or algorithm may set the range. The range could be anything less than a second, half a second, or any other suitable range. By allowing the reference set of data to be adjusted, behavior engine model 25 may learn as it collects more data and becomes more accurate in identifying issues.

Learning and monitoring module 31 of OBU 30 may be configured to receive a plurality of data from the plurality of machine devices and identify a state from the machine device using the set of data. The set of data is in the plurality of data and the state is based on a behavior associated with the machine device. There may be multiple sets of data within the plurality of data. The plurality of data may be all data received from the machine device. Whereas each set of data may represent a different behavior from the machine device. For example, if sensor 14 *a* is responsible for detecting braking, sensor 14 *a* may have a set of data that corresponds to a brake being applied and a different set of data that corresponds to no brake applied. Learning and monitoring module 31 may receive each set of data and identify a state for each set of data. For example, a first set of data may be identified as a "brake applied" state and a second set of data may be identified as a "brake not applied" state.

By identifying different states for each machine device, learning and monitoring module 31 allows legacy systems to communicate with each other. Once a state is identified, that state may be sent to networks 40 and then used by other vehicles 59 and/or implemented in further coding of future systems. By all vehicles utilizing this process, behavioral states may quickly be identified.

Figure 2:
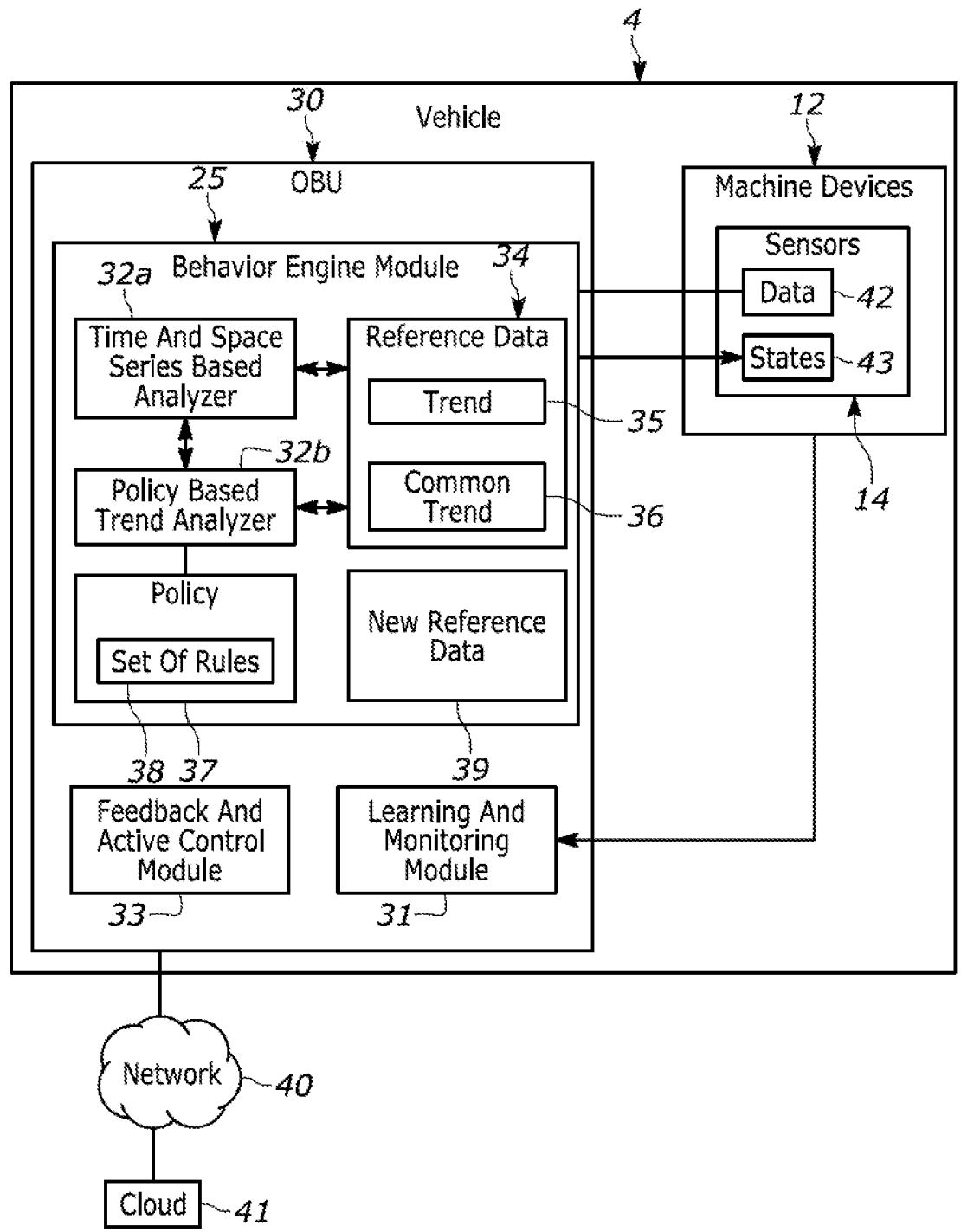
FIG. 2 is a simplified block diagram illustrating possible example details that may be associated with embodiments of an on-board unit (OBU) of the communication system.

FIG. 2 discloses a block diagram illustrating possible example details that may be associated with embodiments of an OBU. In this illustrative embodiment, machine devices 12 encompass sensors 14. Sensors 14 may be utilized in vehicle control system information, visual/radar/lidar-based change in surrounding events/objects, etc.

Sensors 14 may include data 42 and states 43. Data 42 may be the data sensors 14 detect in response to monitoring and transmit to OBU 30. For example, a sensor may identify that the eyes of the driver are closed. The sensor may then turn that information into data to transmit to behavior engine module 25 and/or to learning and monitoring module 31. (Learning and monitoring module 31 will be further described herein). Data 42 may represent all data transmitted from sensors 14. Within data 42 are states 43, which can be behavioral states. A set of data within data 42 may indicate a certain behavioral state is occurring. For example, a set of data within data 42 may indicate that an object is in the road. This set of data may be identified and associated with a state within states 43. Although sensors 14 are primarily shown and described herein, it will be apparent that other types of machine devices 12 such as ECUs or actuators, for example, may also have data and states associated therewith. Thus, the activities described herein are applicable to data from any type of machine device 12 providing suitable data for monitoring, identifying abnormal behaviors, diagnosing and predicting malfunctions, and/or learning behavioral states.

Behavior engine module 25 of OBU 30 can be configured to analyze data 42 from machine devices 12. In one embodiment, behavior engine module 25 may use time and space series based trend analyzer 32 *a* and policy based trend analyzer 32 *b* to identify anomalies/deviations within machine devices 12. With reference to analyzers 32 *a* and 32 *b*, 'time' refers to a date and possibly a time, and 'space' refers to a location.

Time and space series based trend analyzer 32 *a* identifies and monitors trends in machine devices 12 over time. Time and space series based trend analyzer 32 *a* may identify an anomaly within machine devices 12 when a piece of data indicates a deviation from past data received about that machine device or a similar machine device. Policy based trend analyzer 32 *b* compares the trends and data from machine devices 12 against a policy and set of rules. Violations of those rules may be identified by policy based trend analyzer 32 *b*.

Behavior engine module 25 may provide reference data 34 for time and space series based trend analyzer 32 *a* and policy based trend analyzer 32 *b*. Time and space series based analyzer 32 *a* uses reference data 34 to compare data 42 with a relevant trend 35. Trend 35 may be a behavioral trend identified from a certain machine device of machine devices 12. For example, trend 35 may be the amount of times a driver blinks or the average length of time the eyes of the driver are closed.

Time and space series based analyzer 32 *a* also uses reference data 34 to compare data 42 with common trend 36. Common trend 36 may be, for example, a common trend among similar machine devices or a common trend among the same or similar machine devices in similar vehicles.

Policy based trend analyzer 32 *b* may use reference data 34 to change a policy or notify interested and authorized entities (e.g., manufacturers, government entities, etc.) of ongoing policy violations. For example, policy based trend analyzer may identify that a majority of drivers speed on certain roads. In response, the speed limit may be changed or more speed enforcement may be used on that road. Policy based trend analyzer 32 *b* may also use policy 37. Policy 37 may be a governmental entity policy, a manufacturer policy, or any other appropriate type of policy based on particular needs and implementations. For example, policy 37 may be based on city ordinances such as speed limits and other laws and/or it may be based on manufacturer safety specifications. Policy 37 includes a plurality of sets of rules, represented by set of rules 38. Set of rules 38 may be the specific elements that apply to specific machine devices. For example, a rule may provide the maximum reaction time for a steering wheel to produce actual tire movement.

Additionally, behavior engine may include new reference data 39. When time and space series based trend analyzer 32 *a* detects anomalies and deviations from trend 35, some of those anomalies may be normal reactions. When a reaction is normal and not one that needs an operation initiated, the data corresponding to the reaction is included in new reference data 39. To determine whether a deviation should trigger an operation or be included in new reference data 39, a range may be used. A range may be a distance in data from trend 35 in which data is still considered normal. The range may be set by a user, a manufacturer or other authorized entity, or by a computer using algorithms.

Behavior engine module 25 may communicate with feedback and active control module 33. Feedback and active control module 33 may initiate operations once an anomaly or a deviation from policy or trend analysis is identified. When an operation is initiated, an alert may be sent to different entities as well as a physical/mechanical action taken. The physical/mechanical action may include applying brakes to prevent an accident, shutting down vehicle 4, or any other suitable and authorized action.

OBU 30 may be connected to network 40. Network 40 may be one example of one implementation of network 40 as show in FIG. 1. Network 40 may be connected to cloud 41 and other vehicles of a convoy 51. While the system may be connected to the cloud 41, it is not a requirement. For example, V2V and V2X communication may be utilized. Cloud 41 may provide processing and storage for data received from machine devices 12 or vehicles in the convoy 51. Cloud 41 may represent one or more clouds, such as private, public, or governmental networks including, for example, a data center/private individual cloud, a private cloud run by regulatory, a federated cloud, a distributed cloud, or any other appropriate type of cloud, which may be accessible by vehicle 4 via network 40. As such, data may be communicated from other vehicles in the convoy 51 and shared amongst the vehicles in a convoy or other vehicles.

Figure 3:
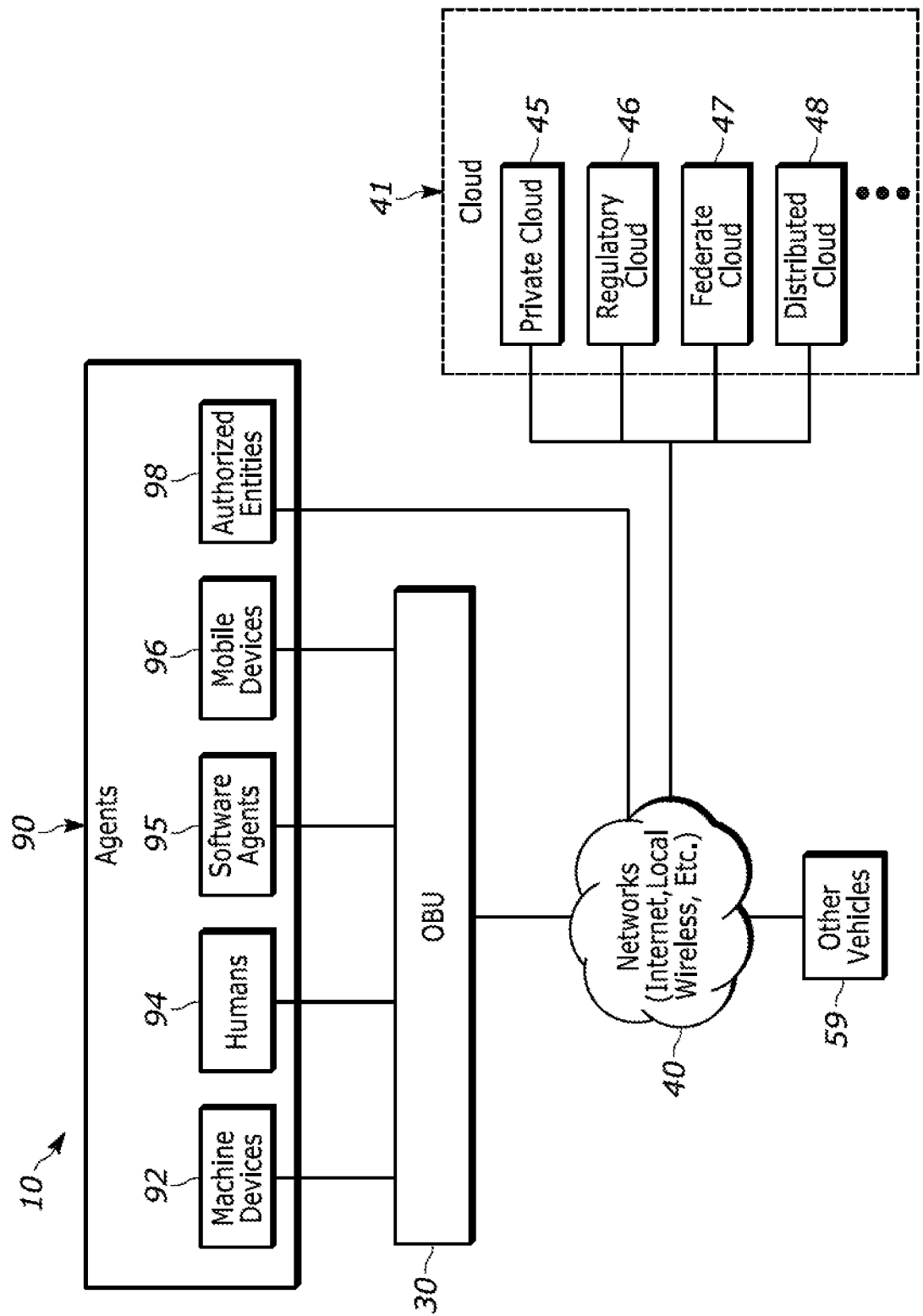
FIG. 3 is a simplified block diagram illustrating potential embodiments of a communication system in a network environment for analyzing vehicular behavior in accordance with the present disclosure.

FIG. 3 discloses a block diagram illustrating possible example details that may be associated with embodiments of an OBU. FIG. 3, an example embodiment of a cloud-based platform of communication system 10 is illustrated with OBU 30 shown coupled to agents 90 and networks 40. In one embodiment, agents 90 can include machine devices 92, and mobile devices 96. In addition, agents can also include software agents 95 and authorized entities 98. Software agents 95 may include any application or executable file comprising instructions that can be understood and processed on a computer, and provisioned in a memory element accessible to OBU 30 (e.g., memory element 24), and which may be initiated automatically in response to a particular set of criteria or conditions (e.g., every time network connectivity is detected on OBU 30, whenever OBU 30 is powered on and a particular time interval has passed, in response to another software agent, etc.).

The different architectural components of the cloud-based platform of communication system 10, as shown in FIG. 3, may include wireless access, cloud computing, and data mining. A palette of wireless technologies, represented by networks 40, is available to vehicles with an OBU (e.g., through network interfaces 26): 3G, 4G LTE, WiFi, WiMax, DSRC, etc. Cloud computing may have embodiments, including, but not limited to various clouds 41 such as a data center/private cloud 45, or any other type of cloud. Networks 40 may facilitate communication between certain agents 90 (e.g., machine devices 92, software agents 95, mobile devices 96) of OBU 30 and authorized entities 98, other vehicles 59, and remote servers or entities.

The present system may use correlation between signals within the same vehicle, as well as correlation between signals among different vehicles in a platoon formation in order to detect anomalies. Thus, the system may analyze how the vehicles communicate with one another to detect an anomaly. The system may not use any physiological signals at all (physiological signals from the driver are never collected). The system may not consider data from external to vehicle devices (mobile phones, laptops, various gadgets etc.) The system may analyze the signals and determine that if a big difference in signal values can indicate the malfunction of one of the trucks in the convoy and can be used as an additional service call signal (for example, in case of spare parts wear) historical values of correlation parameters can be used as an additional source of information for road conditions monitoring.

The system may utilize an automotive IDS that collects automotive signal data as well as detected security events that are sent to a cloud backend for further processing. The automotive signal data can include all the CAN traffic on the CAN network for a particular period of time. For example, if we denote this signal data as a set of values S_v1=S1_v1, S2_v1, S3_v1, v . . . , Sn_v1 in no particular order where the v1 refers to vehicle identified as v1. In a platoon there can be multiple vehicles whose signals would be denoted with v2, v3, v . . . for vehicle 2, vehicle 3 and so on.

It may be understood that signals in a vehicle (e.g. v1 and call the set S_v1) may be correlated as they describe some physical phenomenon and, thus, may be linear or non-linear relations among some of these signals that can be easily calculated. The main observation may be that in vehicles in a platoon formation, the signals in all vehicles in the platoon are correlated across vehicles and therefore we can take advantage of this to detect an attack to a subset of vehicles in the platoon.

Figure 4:
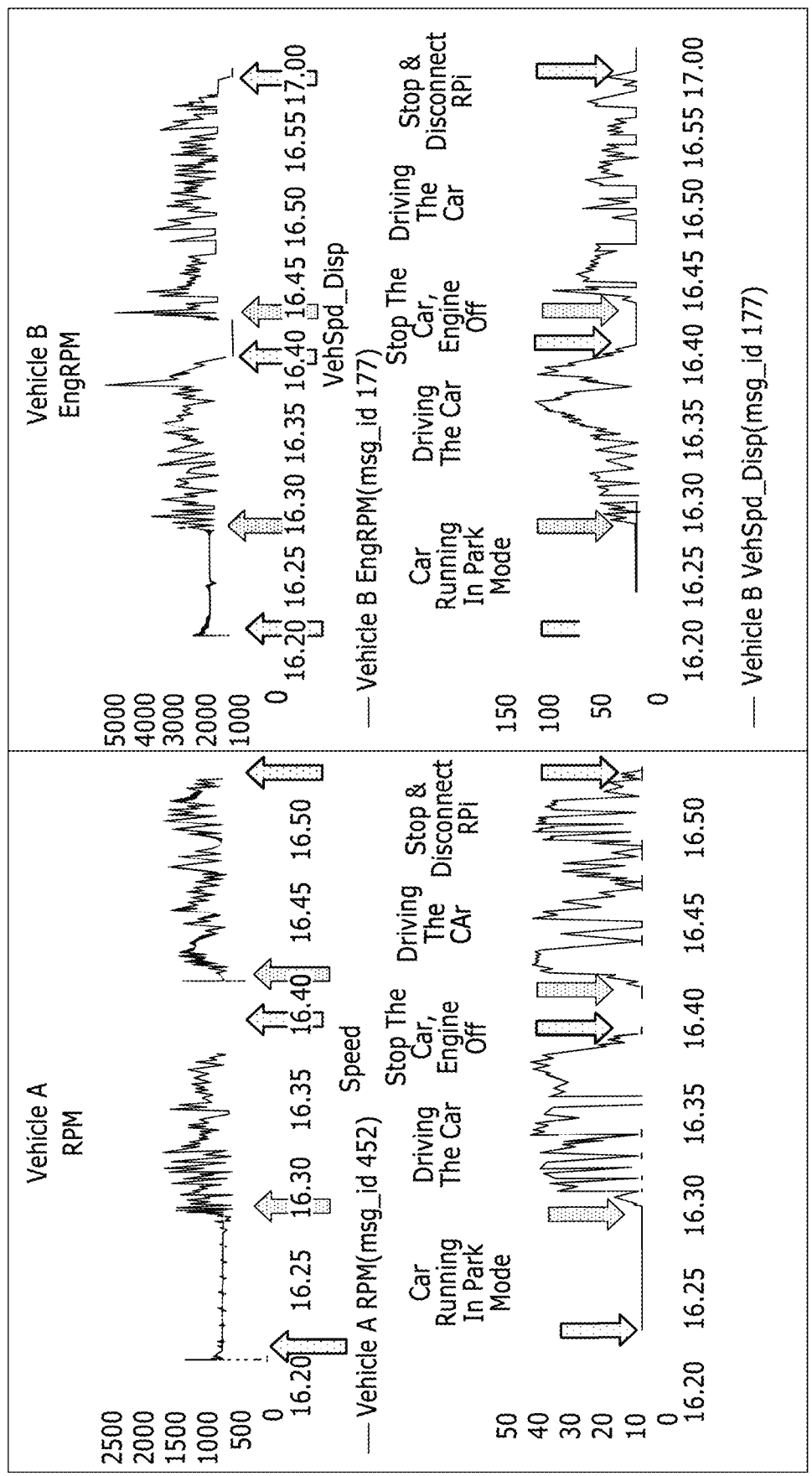
FIG. 4 illustrates examples of the correlation in signals across two completely different vehicles from two different manufacturers when the vehicles drive following the same travel.

FIG. 4 illustrates of examples of the correlation in signals across two completely different vehicles from two different manufacturers when the vehicles drive following the same travel plan (an example of travel plan would be for all vehicles to start and wait for 3 minutes, start driving for 10 minutes, stop for 3 minutes, drive for another 10 minutes, come to a stop, park the car and turn off the car). For example, the signals may observe an engine RPM or driving speed of both Toyota or Mercedes vehicles. In such a scenario as shown in FIG. 4, the vehicle may start with the car in park, turn the radio off and then turn off the lights. The system may observer that the car is running and the driver may open and close the driver door 3 times. The system may open the driver door again, walk around the passenger door, and open and close the door 3 times.

Figure 5:
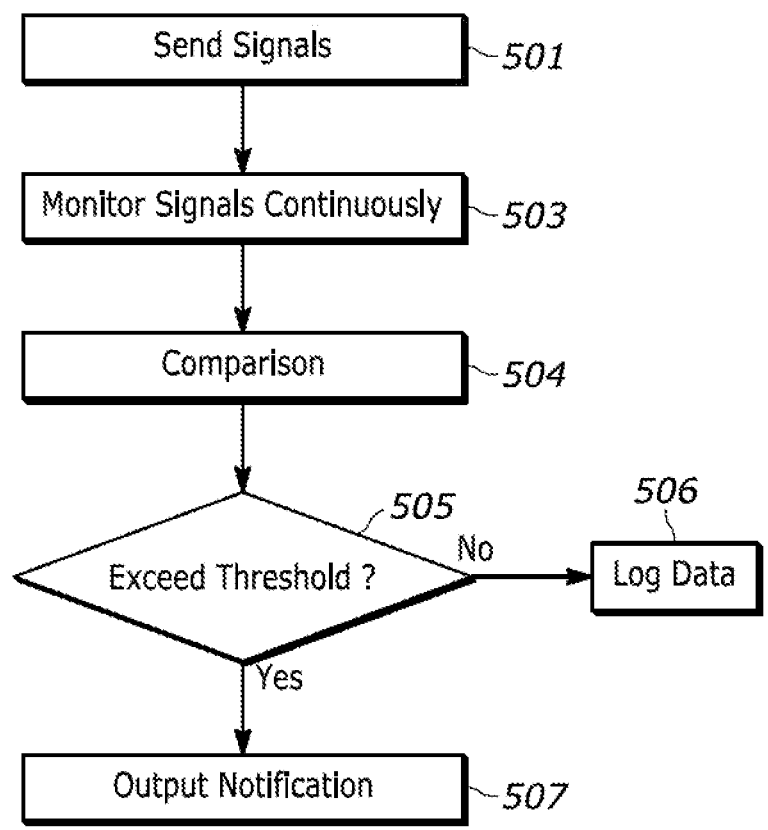
FIG. 5 illustrates an embodiment of a flow chart as related to the monitoring of the vehicle platoon according to an embodiment.

FIG. 5 is a flow chart as related to the monitoring of the vehicle platoon according to an embodiment. The system may assume that a majority of the vehicles are not attacked, thus, in a platoon with K vehicles, there will be more than ceiling (K/2)+1 vehicles that the system can reliably assume to be secure. Alternatively, one can assume that one of the vehicles in the platoon/convoy cannot be compromised because it has been built with a highly secure architecture or ECU units. So in a system that decided if a particular measurement or signal is correct based on majority voting (as in the system that requires ceiling (K/2)+1 vehicles operate in a reliable manner, the vehicles with extra secure hardware (e.g. a leader vehicle) could be weighted higher than any other "normal" vehicle. Under such an assumption, at step 501, the vehicles (e.g., v1 thru vK) may send their signal sets S_v1 to S_vK to a backend server on a continuous basis. At step 503, the system may have one or more servers monitor all signal sets on a continuous basis. Thus as the signal comes in, the monitoring may occur on a continuing basis. The signals may be labeled with respect to the vehicle. Thus, the vehicle name, model, manufacturer, and other information may be included.

Under normal circumstances (e.g., no data breach), all signal sets should follow similar behavior. For example, if S1_v1, S1_v2, . . . , S1_vK correspond to the signals that encode the speed of the vehicles and all vehicles are in a platoon formation, then all the speeds should encode at the same speed (with a small tolerance or with very small variations). For example, a tolerance or variation of +/− one to five mph may be normal. While this may be true for one type of signal, this may also be the expectation for most signals. During this training or controlled measurement, the algorithm can calculate a threshold which defines the largest distance between any two same signals coming from different vehicles observed during the training phase. This will be defined as a threshold T_Si for a single signal type Si_vj for all vehicles vj in the set (for j=1 to K). This can be done for all signals that are being monitored.

The threshold can be computed using different types of distance measures. For example, the threshold to measure a deviation may be calculated utilizing Euclidean distance, Dynamic Time Warping (DTW) distance, correlation between two signals, L1 distance, a machine learning algorithm that classifies two signals as being close enough to each other (for example, random forests, gradient boosting, linear regression, etc.), or a deep learning algorithm that is trained (e.g., binary classification into two classes: under a certain threshold or above it, corresponding to normal or abnormal/anomalous behavior, respectively).

Once the threshold T_Si has been defined, the difference between the signals from different vehicles may be continuously monitored in the cloud backend by comparing them to the threshold T_Si for all relevant signals at step 504. As discussed further, the monitoring may be occurring at a leader vehicle, which may have higher security standards in one illustrative embodiment. The leader vehicle may communicate logging, thresholds, and other information to a remote server. The system may collect data from all the different vehicles. Once collected, it may be analyzed later on, either on-board at a vehicle in the convoy or even remote from the convoy.

At decision 505, the system may determine if the difference from the comparison exceeds an threshold. If the difference between the signals Si_vr and any other signal Si from a different vehicle is larger than the threshold T_Si, then the backend checks if this is true for the majority of the vehicles in the platoon. If it is, an alarm or notification may be output or raised at step 507. If not, then the event is logged and no alarm is raised at step 506. The log can later on be used to verify if an actual attack happened and it was not detected, in one embodiment. A backend server may utilize software or manual analysis to observe the deviation. In another embodiment, the log may be utilized to understand lateral movements of an attacks, for forensic analysis, etc. The determination of whether the signals are close to each other or not may not be based on the detection of a first event and then a subsequent comparison, but instead by comparing signals on a continuous basis on the backend and performing or executing an algorithm which may conduct a majority voting. In an embodiment, the system may not use any input from the driver or the surroundings from the vehicles except as measured by internal vehicle signals.

In another embodiment, a possible variation includes an alternative embodiment in which the system is fully autonomous and all comparisons to a given threshold happens in the platoon. One way in which this could be implemented is as follows. In a set-up phase, the platoon (possibly in a secure location) elects one (possible several) vehicles that will collect data from all others in the platoon. For example, in a platoon composed of three vehicles one could be selected as the "leader" of the platoon. This one vehicle would act as the backend in the main embodiment. Thus all other vehicles would send data to the leader vehicle. The rest of the implementation would work the same as in embodiment 3.1 except that the leader performs the operations originally performed by the cloud. Notice that the number of messages and bandwidth consumed in such an implementation is slightly better than in the cloud deployment (since there is one less vehicle sending data, e.g., the leader).

In an embodiment where large convoys are to be deployed, it might be advantageous to have multiple leader vehicles. A convoy may include two or more vehicles in one embodiment. Large convoys may include more than three vehicles in one embodiment. Thus, the vehicles may be able to organize the convoy in a hierarchical form, in which the convoy is organized into multiple subsets, which send messages to their corresponding leaders and this in turn send data to the main leader. The grouping of the convoys may be selected by vehicle type (e.g., same manufacturer or model) or another similar structure. An alternative is that all leaders may send messages to each other. A different method, may include to have all vehicles that are NOT leaders send messages to all leaders. This will required more bandwidth, but may provide possibly another level of checking and, thus, higher assurance.

In deployments, it may be assumed that the leaders are vehicles with higher security as they are the ones comparing to a particular threshold and deciding whether or not an attack has possibly happened. For example, the leader vehicle may have increased security provisions or monitoring. The leader vehicle may include different security hardware than other vehicles in the platoon. For example, higher grade hardware security modules or additional hardware security may be deployed in the internal network of the leader car. In another embodiment, the leader vehicle may include more IDS nodes in the vehicle (for example, typically, one would have a central deployment of an IDS in the gateway), one could deploy in more ECUs, or have the network of the car designed with more gateways, each of which has an IDS in it. In another embodiment, the leader vehicle may be monitored or scrutinized remotely by hardware, remote servers, or other security services. In yet another embodiment, the system of a leader vehicle may include more bandwidth to send more fine grained data back to the cloud or perform checks more frequently. The leader vehicle may also include less network interfaces in an effort to increase security. For example, one could design the vehicle leader without physical access to the CAN Bus from the OBD port (e.g., no OBD port) or no physical access from certain nodes which typically have access (e.g., vehicle lights). Thus, the leader vehicle may have an entirely different network design, despite being the same vehicle model or vehicle manufacturer. Additionally, the traffic signal in the lead vehicle may be different, as normally CAN traffic is not encrypted, but in the case of the vehicle lead, the CAN data may be encrypted. Such an embodiment of the vehicle leader may require special configuration during manufacturing or during platoon trip set-up configuration or planning. In one embodiment, data and signal from the other vehicles in the convoy may be sent to the leader device. The signals may then be compared to the behavior recorded in the leader device. This may be in contrast to checking locally first, and then based on the check sending for further analysis. No cloud component is envisioned in this embodiment, but might be added as an additional layer of security. No use of driver behavior or environmental conditions may necessarily be utilized in the embodiments disclosed of the present embodiments.

In an alternative embodiment, the system may determine where the difference between the signal Si_vr in some vehicle vr and signal Si_vl from a different vehicle is larger than the threshold T_Si for the majority of the vehicles in the platoon this can indicate that there is a defect/malfunction in one of the systems of vehicle vr and a notice could be sent to a service center that some system or vehicle details should be checked or replaced. Moreover, if this difference in signals is detected in a large subset of vehicles a notice can be sent also to OEM because probably there is a manufacturing problem with some subsystems in a certain batch of vehicles.

In yet another embodiment, historical values of signal relations from an embodiment (which may be stored in the cloud) can be subsequently use for road condition monitoring. For example, when a platoon follows the same route from point A to point B and after some period of time the system may determine or evaluate that there is a big difference of signals changing for majority of vehicles on some section of track, this can signal or indicate a worsening road conditions. Thus, the system may determine that a portion of a road or track section should be checked for problems with the road surface, road signs, traffic lights, or any other issues. Thus, a set of data from a platoon in one time period may be compared with another to see if there is a deviation in another environmental aspect. Thus, navigation data and GPS information may be utilized to evaluate a certain segment.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method executed by an on-board unit coupled to a Controller Area Network (CAN) bus of a vehicle, comprising:
receiving a set of data in real time from a plurality of vehicles in a convoy, wherein the set of data includes an indicator regarding a vehicle type within the convoy and the convoy includes vehicles traveling along a same route;
providing a policy with a set of rules;
comparing the set of data with the policy;
providing a set of reference data corresponding to the plurality of vehicles in the convoy, wherein the set of reference data includes a trend of previous data indicating normal operation of the vehicles in the convoy, wherein the set of reference data includes data associated with CAN)\traffic on the CAN network for a particular period of time;
comparing the set of data with the set of reference data, wherein a determination of whether the set of data deviates from the trend of previous data is based on operation of one of the plurality of vehicles in the convoy; and
initiating an operation via the onboard unit when there is both a violation of the policy and a deviation within the set of data from the set of reference data is detected.

2. The method of claim 1, wherein comparing the set of data with the policy is conducted at a leader vehicle of the convoy.

3. The method of claim 2, wherein all vehicles of the convoy other than the leader vehicle communicate data to the leader vehicle.

4. The method of claim 1, wherein the set of data does not include physiological signals.

5. The method of claim 1, wherein the set of data does not include any data external to a mobile phones, laptops, or other remote devices.

6. The method of claim 1, wherein the determination of whether the set of data deviates is conducted utilizing a Euclidean distance, a Dynamic Time Warping distance, a L1 distance, random forests, gradient boosting, correlations, or linear regression.

7. The method of claim 1, wherein the one or more processors is programmed to determine whether the set of data deviates from the trend of previous data for a majority of vehicles in the convoy.

8. A method executed by an on-board unit of a vehicle, comprising:
receiving a set of data in real time from a plurality of vehicles in a convoy, wherein the set of data includes indicator regarding a vehicle type within the convoy and includes data associated with controller area network (CAN) traffic on the CAN network for a particular period of time, and the convoy includes vehicles traveling along a same route;
providing a set of reference data corresponding to the plurality of vehicles in the convoy, wherein the set of reference data includes a trend of previous data indicating normal operation of the vehicles in the convoy;
comparing the set of data with the set of reference data, wherein a determination of whether the set of data deviates from the trend of previous data is based on operation of one of the plurality of vehicles in the convoy; and
initiating an operation when there is a deviation within the set of data from the set of reference data is detected.

9. The method of claim 8, wherein the method includes further providing a policy with a set of rules, and comparing the set of data with the policy.

10. The method of claim 8, wherein the determination of whether the set of data deviates is conducted utilizing a Euclidean distance, a Dynamic Time Warping distance, a L1 distance, random forests, gradient boosting, correlations, or linear regression.

11. The method of claim 8, wherein the method includes a set-up phase where a lead vehicle selected from the convoy collects data from all other vehicles in the platoon, wherein the lead vehicle receives the set of data from the plurality of vehicles in the convoy and executes the comparing of the set of data with the set of reference data and the initiating of the operation.

12. The method of claim 8, wherein the operation includes a counterattack to an action causing the deviation, wherein the action includes maneuvers to the vehicle deviating from the convoy eventually to a safe state, wherein the maneuvers include stopping, changing a speed, or adjusting steering.

13. A system for monitoring a plurality of vehicles in a convoy, comprising:
a wireless transceiver in one or more of the plurality of vehicles and configured to communicate data from the plurality of vehicles;
one or more processors, wherein the one or more processors is in communication with the wireless transceiver, wherein the one or more processors are collectively programmed to:
receive a set of data in real time from a plurality of vehicles in a convoy, wherein the set of data includes an indicator regarding a vehicle type within the convoy and the convoy includes vehicles traveling along a same route;
provide a set of reference data corresponding to the plurality of vehicles in the convoy, wherein the set of reference data includes a trend of previous data indicating normal operation of the vehicles in the convoy;
compare the set of data with the set of reference data, wherein a determination of whether the set of data deviates from the trend of previous data is based on operation of one of the plurality of vehicles in the convoy; and
initiate an operation to output a notification when there is a deviation within the set of data from the set of reference data is detected.

14. The system of claim 13, wherein a plurality of processors in the one or more processors are collectively configured to be programmed.

15. The system of claim 13, wherein a single processor in the one or more processors is configured to be programmed.

16. The system of claim 13, wherein the one or more processors are programmed to determine whether the set of data deviates from the trend of previous data for a majority of vehicles in the convoy, and if the set deviators for the majority of vehicles, initiate the operation to output the notification.

17. The system of claim 13, wherein the one or more processors is programmed to determine whether the set of data deviates from the trend of previous data for a majority of vehicles in the convoy, and if the set does not deviate for the majority of vehicles, do not initiate the operation to output the notification.

18. The system of claim 13, wherein the set of data does not include driver behavior data or environmental conditions data.

19. The system of claim 13, wherein the one or more processors are programmed to execute a setup phase that collects data from a plurality of vehicles in the convoy in a secure location of the system.

20. The system of claim 13, wherein the one or more processors are programmed to program the set of data continuously.

* * * * *